Dec. 7, 1965     C. A. CLARK     3,221,702
UNDULATING SURFACE DRIVING SYSTEM
Filed Oct. 30, 1964     2 Sheets-Sheet 1
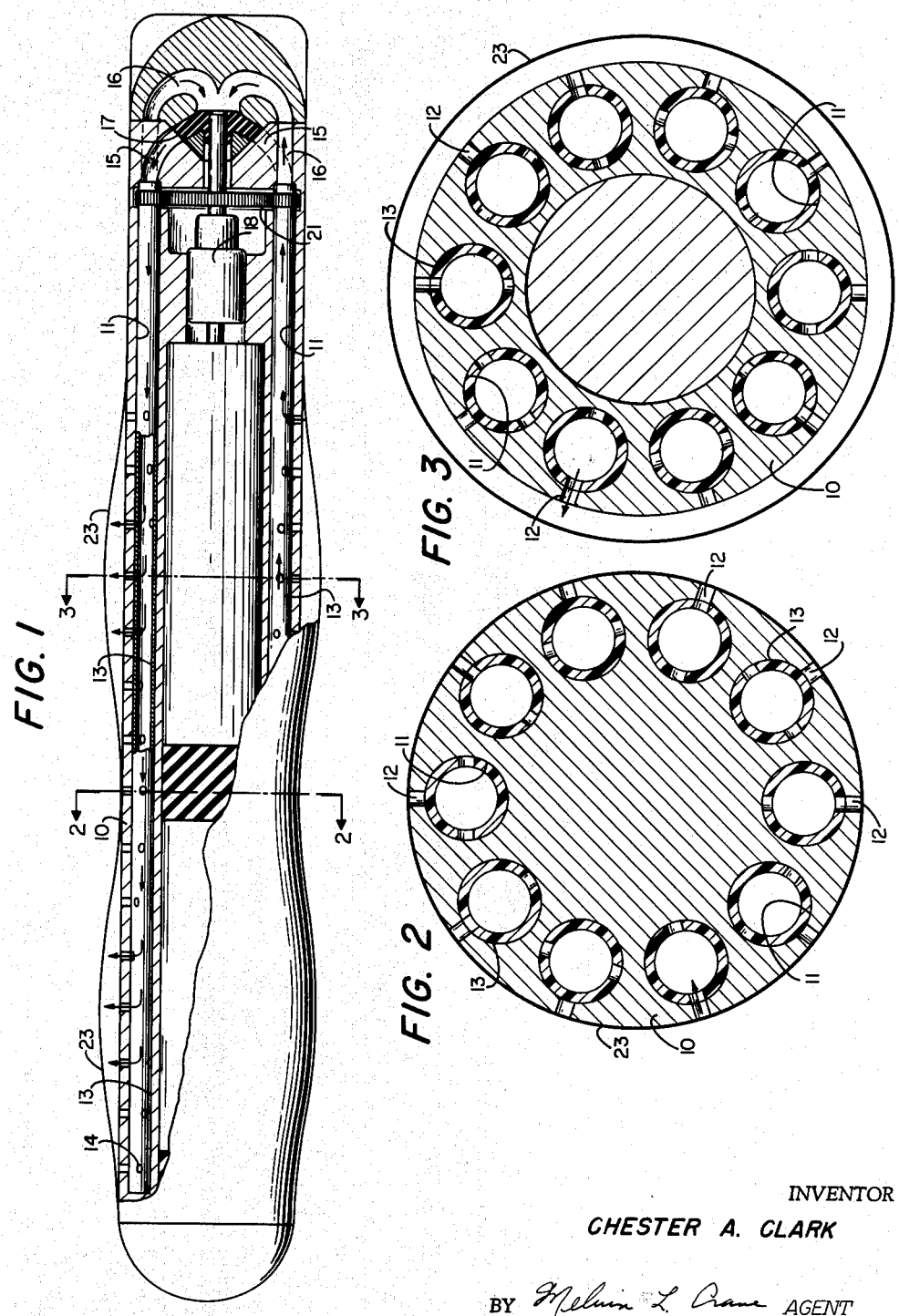
INVENTOR
CHESTER A. CLARK
BY *Melvin L. Crane* AGENT
*R. S. Sascin* ATTORNEY Dec. 7, 1965     C. A. CLARK     3,221,702
UNDULATING SURFACE DRIVING SYSTEM
Filed Oct. 30, 1964     2 Sheets-Sheet 2

INVENTOR
CHESTER A. CLARK
BY *Melvin L. Crane* AGENT
*[signature]* ATTORNEY

United States Patent Office 3,221,702
Patented Dec. 7, 1965

3,221,702
UNDULATING SURFACE DRIVING SYSTEM
Chester A. Clark, Rte. 2, Box 42, Waldorf, Md.
Filed Oct. 30, 1964, Ser. No. 407,931
6 Claims. (Cl. 115—.5)
(Granted under Title 35, U.S. Code (1952), sec. 266)

The invention described herein may be manufactured and used by or for the Government of the United States of America for governmental purposes without the payment of any royalties thereon or therefor.

The present invention is directed to a propulsion system and more particularly related to a marine propulsion system which is quiet and requires no externally rotatable parts.

The present propulsion system comprises a cylindrical body of rigid material such as metal, Teflon or any other suitable material in which the outer surface of the body approximates a cigar shape. The inner surface of the cylindrical body is provided with a plurality of axially aligned elongated tubular openings which serve as bearing surfaces for elongated rotary valves inserted into the tubular openings. The cylindrical body is provided with equally spaced axially aligned apertures through the surface thereof meeting with the elongated tubular openings to permit fluid flow through the valves and through the aperture in the body.

The operating means comprises a hydraulically expansible material about the body in which the expansible material is expanded along the length of the body by a plurality of flow controlling valves driven by a variable speed motor. A motor driven pump within the body circulates and maintains pressure on a fluid which communicates with the valves. Alternating valves permit expansion and contraction of the expansible material in timed relationship. Thus portions of the expansible material are expanded while sections in between are contracted. Contraction of the expansible material is produced by the pressure of the surrounding water which acts against the fluid pressure within the expansible covering. The timing of the valves are such that the expansible material becomes expanded and contracted in timed relationship. Thus, the expansible covering under the influence of the pressure pump and the surrounding pressure takes the shape of a sine-like wave which travels along the length of the body. The motion provides propulsion motion to the vessel or device.

It is therefore an object of the present invention to provide a novel propulsion system for underwater devices.

Another object is to provide a propulsion system which is quiet in operation.

Still another object is to provide a propulsion means by development of a sine-like wave motion about a body to be propelled.

Other objects of this invention will become apparent from a more careful consideration of the following detailed description when taken together with the accompanying drawing, in which:

FIG. 1 is a partial cross sectional view of the device taken along the linear axis;

FIG. 2 is a cross sectional view taken perpendicular to the axis through a non-pressure area;

FIG. 3 is a cross sectional view across a pressure area;

Figure 4:
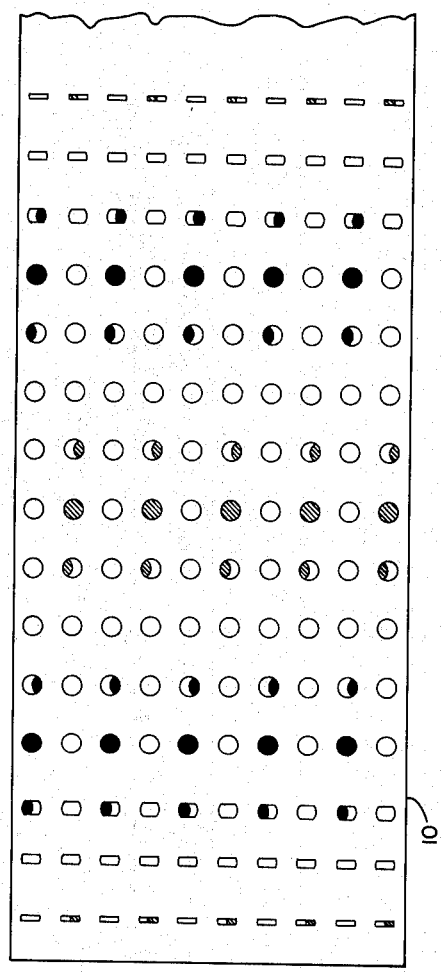
FIG. 4 is a rolled out view, illustrating the relationship of pressure and return valves at one instant relative to the apertures in the body.

Now, referring to the drawings wherein the same reference characters represent like parts throughout the specification and drawings, there is shown by illustration a propulsion system made in accordance to the present invention. The propulsion system includes a cylindrical body 10 of rigid material such as metal, plastic, glass, or any suitable desired material. The outer form of the cylindrical body is somewhat cigar shaped and the inner surface is provided with elongated channels 11 or axially aligned passages along most of its linear portion positioned with their axis on a circle about the axis of the body. The linear portion of the body is provided with axially aligned apertures 12 which pass through the outer surface of the body into the area of the elongated channel, one row of apertures for each of the channels.

The channels provide pressure and return lines for fluid under pressure. Every other line being a pressure line and each alternating channel being a return line. Each of the channels may be lined to provide a bearing surface, if necessary. An elongated cylindrical valve 13 is placed within each of the channels and has a close fit with the surface of the channel such that fluid under pressure does not escape along the valve. The valve is provided with a plurality of apertures 14 through the wall of the valve and arranged upon assembly such that the axial position of a row of apertures in each of the valves align with the position of its mating row of holes or apertures in the body of the device. Also, the helically arranged apertures could be in the body and the axially aligned apertures in the valve, or both sets could have a helical arrangement. The apertures in each of the valves are arranged on a helix and the spacing of the apertures in the body and rotation of the valves are such that alternate successive groups of apertures will be open to the pressure lines and to the return lines, respectively.

Each of the pressure channels is connected with a pressure line 15 from a pump 17 and each of the fluid return channels are connected with the return lines 16 to the pump. The pump 17 is driven by a motor 18 through a variable gear drive arrangement such that the pressure in the valve channels can be controlled. The motor also rotates the elongated control valves within the channels in the body by a driven gear 21 through a reduction gear arrangement 22 with variable control means so that the speed of the driven device may be regulated. In case of a torpedo or a non-personnel carrier type, the drive means need not be variable. Any suitable means may be used to power the motor such as a storage battery for a non-personnel type device or any conventional means, nuclear or any other type for generating electrical power for a personnel carrier type such as a submarine.

The body 10 is covered by an expansible covering 23 over the linear section thereof in the area opposite to the rotatable valves in the linear channels, a suitable covering being the Kramer simulated porpoise skin. The expansible material contains the fluid under pressure and the expansible material is expandable along the length of the body such that a fluid admitted by the valves in cycles, travels from one end of the device to the other as a travelling wave. Successive waves follow according to the wave length which depends on the arrangement of the holes in the rotatable valves in the pressure channels which permit fluid to be forced outwardly through the openings in the body and to be returned to the pump through the apertures in the valves in the return lines. FIG. 4 illustrates the body rolled out into a rectangular diagram illustrating the fluid pressure and fluid return areas and the relationship of the apertures in the valves with the apertures in the body at one particular instant and position of the valves. The solid circles illustrate fluid under pressure and the cross hatched apertures illustrate fluid to the return lines. The circles not solid or cross hatched represent closed apertures or portions thereof.

In operation of the propulsion system, with the system filled with hydraulic fluid, the motor is started to pump up the pressure to produce fluid flow through the pressure lines to the valves in the pressure channels. The apertures in the valves are on a helix such that there will be alternating groups of apertures that will permit fluid under pressure to pass through the apertures in the body to the area of the extensible material. An equal number of apertures in the valves in the return channels will open apertures in the body to permit release of fluid from the area of the extensible material to the pump return. As the valves are rotated by the driven gear, successive apertures in the pressure and fluid return areas will be opened to the pressure and return lines to produce a traveling wave along the body such that the propulsive effect is in the form of a sine-like wave which extends along the length of the body.

The valves are rotated simultaneously such that the return valves trail the pressure valves by 180 wave degrees and the valves are arranged with the pressure and return lines alternating. Thus the apertures in each of the valves will be open or closed, as represented by FIG. 3, depending on the rotational position of the valves. The degree of being open or closed is the same for each set of valves, pressure or return in a plane perpendicular to the axis through any of the apertures. Thus each alternating valve will supply fluid under pressure through the apertures in the body and those in between the pressure lines will provide a return to the pressure pump.

Since the device being propelled is surrounded by water, the ambient pressure from the water will prevent the expansible material from expanding in the force areas beyond the desired limits and also forces the fluid into the return lines. As the valves are rotated, some of the apertures are closed while others are opened through each of the pressure and return valves. The same number of apertures in the valves are always open to the pressure lines and to the return lines so that the crests of the waves formed by the pressure area, moves along the length of the body. The openings in the body are made smaller at the ends to act as a buffer at the termination of the wave.

For propulsion of torpedos, the drive means can be operated for driving the undulating waves in one direction along the body. However for propulsion of a personnel carrying vessel such as a submarine the vessel must be able to be propelled forward and backward. The valves may be driven in the opposite direction from that described above and the fluid will be forced through the apertures such that the undulating waves will be driven in the opposite direction along the body. Thus, the vessel will be driven in the opposite direction. The valve action is similar to a worm screw pump which drives fluid in one direction when rotated in one direction and in the opposite direction when driven in the reverse direction.

In use of the propulsion system for personnel carrying type vessel there is a possibility that the expansible material may develop a leak which would prevent operation of the undulating wave drive. Thus the vessel may be equipped with a propeller secured to a shaft extending out of the back of the device and operable through use of the fluid drive means. The propeller could be feathered during use of the undulating wave drive so that very little drag would be produced by the propeller blades.

The fluid propulsion system may be modified in various ways by use of different valve arrangements. One valve may be rotated inside of each of the above described valves and rotated in the same or opposite direction to increase or decrease the frequency of the driving waves. Such a system could be used to develop the best frequency relative to the speed of the device.

Such a system can also be used as a sonar projector by rotation of the valves at suitable speeds to provide a required sonar frequency. Thus the system for developing travelling waves about the surface of a body may be used as a propulsion system and/or a sonar projector through control of the rotational velocity of the valves.

Figure 5:
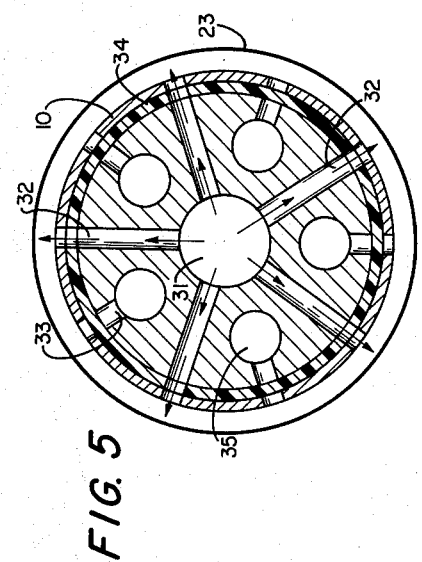
FIG. 5 is a modification of the fluid drive system shown by illustration in FIG. 1.

The device has been described as having a plurality of valves positioned with their axes on a circle about the axis of the body. The system may be made in accordance to the modification shown in the cross sectional view illustrated by FIG. 5. This view illustrates a device having an axially extending pressure line 31 with a plurality of radial pressure lines 32 extending outwardly therefrom. A plurality of radial fluid return lines 33 are positioned outwardly of the axial pressure line and between each of the radial outwardly extending pressure lines. A cylindrical valve concentric with the axial pressure line is rotated about the axial pressure line cutting the outwardly extending pressure line and the lines 33 to the fluid return lines. The rotating valve has apertures through the surface thereof in a helical arrangement such that the axial position of a row of apertures are in alignment with the radially extending pressure lines and the radial return lines to permit fluid to flow through the pressure lines into the area between the extensible material and the body and to be returned to the pump. The propulsion would be produced by sine-like waves as discussed above for the device with a plurality of rotatable valves. Such a drive system can be used for a torpedo or as a sonar projector.

Obviously many modifications and variations of the present invention are possible in the light of the above teachings. It is therefore to be understood that within the scope of the appended claims the invention may be practiced otherwise than as specifically described.

What is claimed is:
1. A propulsion drive system which comprises:
   an elongated cylindrical body,
   a plurality of rows of axially aligned tubular passages in said body with their centers equidistant from the axis of said body,
   a plurality of linearly aligned apertures in said body extending from the outer surface thereof into said tubular passages,
   an extensible material secured about said body enclosing the area including said apertures in said body,
   a valve arrangement within each of said tubular passages,
   means for rotating each of said valve arrangements, relative to said apertures in said body,
   means for supplying a fluid under pressure to alternate passages in said body,
   means for returning fluid to said fluid supply means from the remainder of said plurality of passages,
   whereby fluid under pressure is forced through said apertures in said body through said passages under pressure and returned to said supply means,
   said fluid under pressure producing a pressure sine-like wave travelling along said body between said extensible material and said body.

2. A propulsion drive system as claimed in claim 1 wherein:
   said valves include helical arranged apertures therein which mate with said apertures in said body as said valves are rotated.

3. A propulsion drive system as claimed in claim 1 wherein:
   said body includes helical arranged apertures therein which mate with said apertures in said rotating valves.

4. A propulsion drive system as claimed in claim 2 wherein:
   said pressure and return valves are 180 wave degrees out of phase.

5. A fluid propulsion system which comprises:
   an elongated circular body, a plurality of axially aligned circular elongated passages within said body with their centers arranged on a circle about the axis of said body,
a plurality of linearly aligned equally spaced apertures in said body extending from each of said passages radially outward through the body and to the outer surface thereof,
an extensible material secured about said body enclosing the area including said apertures in said body,
a valve arrangement within each of said axially aligned circular elongated passages within said body,
means for rotationally driving each of said valves relative to the apertures in said body,
fluid pressure producing means having a suction side and a pressure side for directing fluid under pressure through alternating pressure valve arrangements through pressure lines,
pressure relief valves alternating with said pressure valve arrangements,
fluid return lines connected between each of said fluid pressure relief valves and the suction side of the pump
whereby fluid under pressure forced through the rotating pressure valves produces undulating sine-like waves along the body between said body and said extensible material.

6. A fluid propulsion system as claimed in claim 3 wherein:
each of said valve arrangements comprises two concentric valves, one rotatable within the other.

References Cited by the Examiner
UNITED STATES PATENTS 3,118,639  1/1964  Kiceniuk _____ 244—44
3,154,043  10/1964  Momsen _____ 115—.5

MILTON BUCHLER, *Primary Examiner.*

ANDREW H. FARRELL, *Examiner.*